United States Patent
Horn

(10) Patent No.: US 6,883,220 B2
(45) Date of Patent: Apr. 26, 2005

(54) METHOD FOR FORMING A TUBE-WALLED ARTICLE

(75) Inventor: Mark David Horn, Granada Hills, CA (US)

(73) Assignee: The Boeing Company, Chicago, IL (US)

(*) Notice: Subject to any disclaimer, the term of this patent is extended or adjusted under 35 U.S.C. 154(b) by 80 days.

(21) Appl. No.: 10/197,039

(22) Filed: Jul. 17, 2002

(65) Prior Publication Data

US 2004/0010900 A1 Jan. 22, 2004

(51) Int. Cl.⁷ .................... B23P 17/00; B21D 39/00
(52) U.S. Cl. ............. 29/421.1; 29/455.1; 29/505; 29/522.1; 29/890.01; 228/157; 72/58; 239/127.1
(58) Field of Search ............. 29/508, 515, 421.1, 29/455.1, 505, 506, 507, 522.1, 890.01, 890.032, 890.053; 239/127.1; 228/157, 161; 72/56, 58, 60, 61

(56) References Cited

U.S. PATENT DOCUMENTS

| | | | |
|---|---|---|---|
| 3,208,132 A | * | 9/1965 | Escher .................. 29/890.01 |
| 3,349,464 A | * | 10/1967 | Becker, Jr. et al. ...... 29/890.01 |
| 3,690,103 A | | 9/1972 | Dederra et al. |
| 3,973,886 A | | 8/1976 | Crum |
| 4,379,390 A | * | 4/1983 | Bottum .................. 62/354 |
| 4,480,437 A | * | 11/1984 | Gauge .................. 60/771 |
| 4,591,534 A | | 5/1986 | Wagner et al. |
| 4,649,493 A | * | 3/1987 | Castner et al. .......... 700/145 |
| 5,309,637 A | | 5/1994 | Moriarty |
| 5,467,528 A | | 11/1995 | Bales et al. |
| 5,618,633 A | | 4/1997 | Swanson et al. |
| 6,067,831 A | * | 5/2000 | Amborn et al. .......... 72/58 |
| 6,176,077 B1 | | 1/2001 | Haggander et al. |
| 6,286,750 B1 | | 9/2001 | Iwadachi |
| 6,305,204 B1 | * | 10/2001 | Tauzer .................. 72/62 |
| 6,470,671 B1 | * | 10/2002 | Kretschmer ............. 60/267 |
| 2002/0056762 A1 | * | 5/2002 | Kretschmer ........... 239/127.1 |

FOREIGN PATENT DOCUMENTS

WO    0758283    11/1995

OTHER PUBLICATIONS

European Search Report, EP 03 01 4488, Nov. 20, 2003.

* cited by examiner

Primary Examiner—David P. Bryant
Assistant Examiner—Marc Jimenez
(74) Attorney, Agent, or Firm—Harness Dickey & Pierce P.L.C.

(57) ABSTRACT

A method for forming an article having a wall that is at least partially fabricated from tubing. The methodology employs a pressurized fluid to deform the tubing such that an outer surface of the tubing substantially conforms to a predetermined first wall configuration, an inner surface of the tubing substantially conforms to a predetermined second wall configuration and each of segment or loop of the tubing is substantially contiguous with at least one other segment or loop between the first and second surfaces.

35 Claims, 2 Drawing Sheets

METHOD FOR FORMING A TUBE-WALLED ARTICLE

FIELD OF THE INVENTION

The present invention generally relates to a method for forming an article having a wall that is at least partially formed from a tube and more particularly to a method for forming an article having one or more tubes wherein the tubes are deformed under pressure to thereby form at least a portion of a wall of the article.

BACKGROUND OF THE INVENTION

Many articles that are employed in the aerospace industry, such as nozzles for rocket engines, are subjected to extremely high temperatures which would cause the article to fail if the article were not actively cooled. One technique for actively cooling such articles includes the use of one or more tubes that are stacked on one another to at least partially form a wall of the article. When the article is in use, a coolant is pumped through the tubes to cool the article and prevent its failure despite the exposure to highly elevated temperatures.

Current manufacturing techniques employ highly toleranced tubes which are fit closely together during the fabrication of the article and thereafter brazed together. Often times, the dimensions of the tubes are painstakenly measured and match-fit into gaps to obtain the best possible fit. Despite these efforts, gaps between the tubes are inevitable and an additional amount of braze alloy (in the form of a paste) is placed between the tubes. Despite the use of additional braze alloy, these gaps frequently result in tube-to-tube braze voids that are found after the brazing operation has been completed. As these tube-to-tube braze voids negatively affect the heat transfer of the article, the article must be laboriously inspected and repaired. The repair consists of filling the tube-to-tube braze voids with additional braze alloy and re-brazing the entire article. Thereafter, the article is re-inspected to identify the presence of tube-to-tube braze voids. Additional brazing and inspecting cycles may be necessary if tube-to-tube braze voids are found.

In view of the above, there remains a need in the art for an improved method for forming a tube-walled article. The improved method ideally permits relatively low-toleranced tubes to be employed to reduce the cost of the article as compared to articles formed with highly-toleranced tubes. The improved method also deforms the tubes so as to eliminate the presence of voids, both on the inner and outer sides of the tube, as well as between tubes.

SUMMARY OF THE INVENTION

In one preferred form, the present invention provides a method for forming an article having a wall that is at least partially formed from one or more tubes. The method includes the steps of: providing at least one tube; arranging the at least one tube in a predetermined manner such that the at least one tube forms a plurality of tube segments that are abutted against one another in a stacked arrangement, each of the tube segments having an annular cross-section with an outer circumference, the annular cross-section being taken generally perpendicularly to a longitudinal axis of the tube segment; exposing the at least one tube to a pressurized gas to deform the plurality of tube segments such that a surface of the at least one tube substantially conforms to a predetermined wall configuration and each of the tube segments contacts at least one adjacent tube segment over an area that exceeds about 5% of the circumference of the tube segment; and heating the at least one tube to a predetermined temperature. The heating step may be performed prior to, concurrent with of after the deforming of the tube segments. Furthermore, the tube segments may be fixed together, as by brazing or diffusion bonding, for example, during the heating step.

In another preferred form, the present invention provides a method for forming an article having a wall that is at least partially formed from a tube. The method includes the steps of: providing at least one tube; stacking the at least one tube in a predetermined manner such that the at least one tube forms a plurality of tube segments that are approximately abutted against one another; heating the at least one tube to a predetermined temperature; and exposing the at least one tube to a pressurized fluid to deform the plurality of tube segments such that a first surface of the at least one tube substantially conforms to a predetermined first wall configuration, a second surface of the at least one tube that is disposed opposite the first surface substantially conforms to a predetermined second wall configuration and each of the tube segments is substantially contiguous with at least one other tube segment between the first and second surfaces. Again, the heating step may be performed prior to, concurrent with of after the deforming of the tube segments and the tube segments may be fixed together, as by brazing or diffusion bonding, for example, during the heating step.

In either approach, the interior of the at least one tube may be evacuated or pressurized (at a pressure above that of the atmosphere). Furthermore, one or more closeout skins may be included to create a pressure containment vessel around the tube segments. One or more of these closeout skins may be allowed to deform with the tube segments and, depending on the design of the article, any of the closeout skins may be optionally integrated into the wall, as through brazing or diffusion bonding to the tube segments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
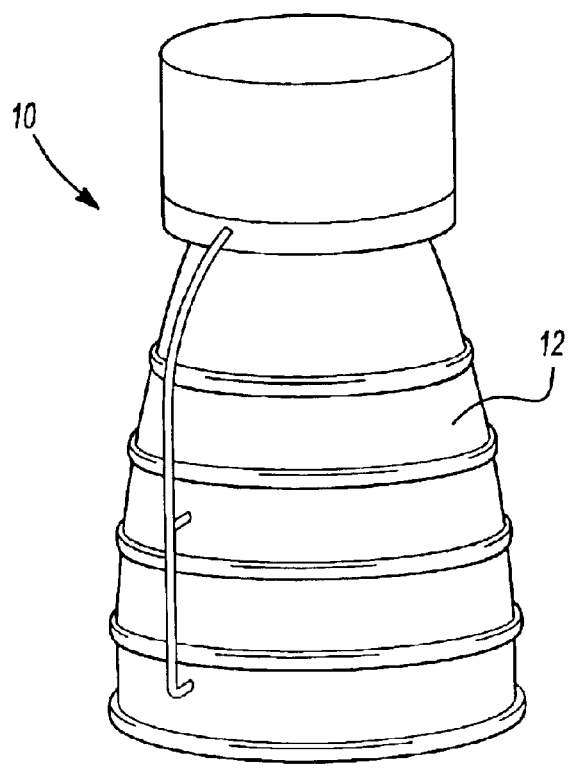
FIG. 1 is a perspective view of an article constructed in accordance with the teachings of the present invention.
Figure 2:
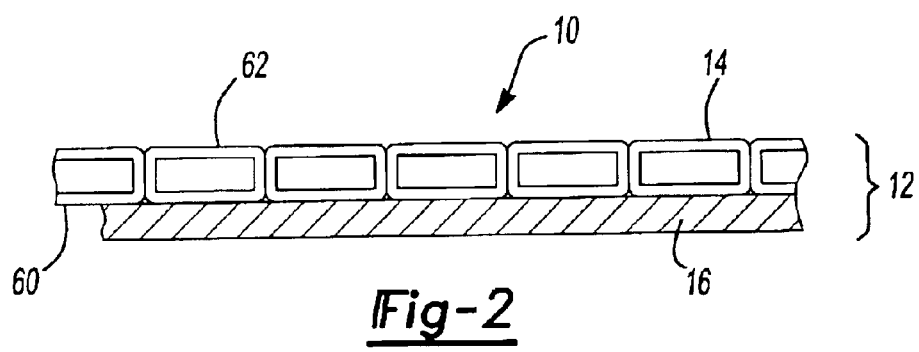
FIG. 2 is a sectional view of a portion of the article of FIG. 1.

With reference to FIGS. 1 and 2 of the drawings, an article constructed in accordance with the teachings of the present invention is generally indicated by reference numeral 10. Although the article 10 is illustrated to be the nozzle of a rocket engine, those skilled in the art will understand that the teachings of the present invention are applicable to various other fields, and in particular to any type of article that performs heat exchanging function. The article 10 is illustrated to include a wall 12, which is formed from one or more tubes 14, and an optional outer closeout skin 16.

Figure 3:
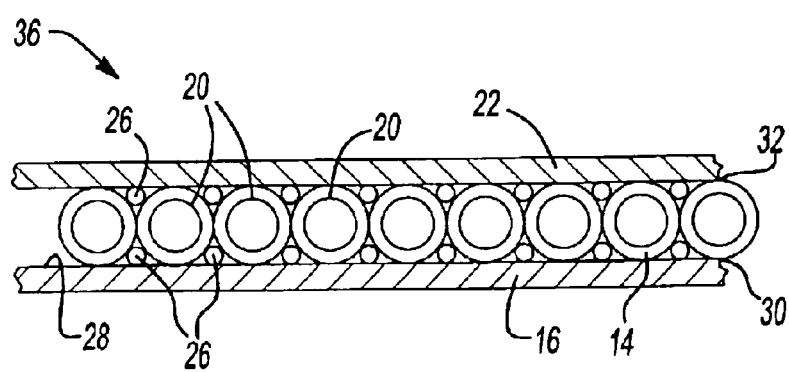
FIG. 3 is a sectional view similar to that of FIG. 2 but illustrating the fabrication of the article of FIG. 1 at a first intermediate stage.

In the example provided, the tubes 14 are formed from A-286 Superalloy, but those skilled in the art will understand that they may be formed from any plastically deformable material. With reference to FIG. 3, the tubes 14 are illustrated as originally having an annular cross-section. The tubes 14 are arranged or stacked (e.g., abutted against one another or coiled) on one another in a predetermined manner to form a plurality of tube segments 20 that build up at least a portion of the wall 12. In the particular embodiment illustrated, the tube segments 20 are stacked about an inner closeout skin 22 in a direction that is generally transverse to a longitudinal axis of the article 10 to provide the article 10 with a generally conical shape. The inner closeout skin 22 is employed during the stacking step to aid in the positioning of the tube segments 20 and also to maintain the tube segments 20 in an approximately abutted condition. Alternatively, the outer closeout skin 16 may be employed during the stacking step. Those skilled in the art will appreciate that the orientation in which the tube segments 20 are stacked is a matter of design choice and as such, it will be understood that the scope of the disclosure and appended independent claims is not to be limited to any particular stacking orientation. In fact, we have found that it is generally preferable that the tube segments 20 be oriented generally perpendicular to that which is illustrated (i.e., generally parallel the longitudinal axis of the nozzle) when constructing nozzles.

As the tube segments 20 are to be brazed together in the particular example provided, a braze foil 26 is applied adjacent the tube segments 20. Also, as the outer closeout skin 16 is to be included in the finished article 10, the braze foil 26 is also applied between the tube segments 20 and the outer closeout skin 16. Alternatively or additionally, the braze foil 26 may be applied between the tube segments 20 and the inner closeout skin 22, if the inner closeout skin 22 is to be included in the finished article. Alternatively, a brazing paste may be applied to secure the tube segments 20 to one another or either of the outer and inner closeout skins 16 and 22. Alternatives to brazing pastes and braze foils, such as a direct plated bonding aid that is applied to the tube segments 20 and/or the outer or inner closeout skins 16 and 22, or a direct diffusion bond system may also be employed within the context of this invention.

Figure 4:
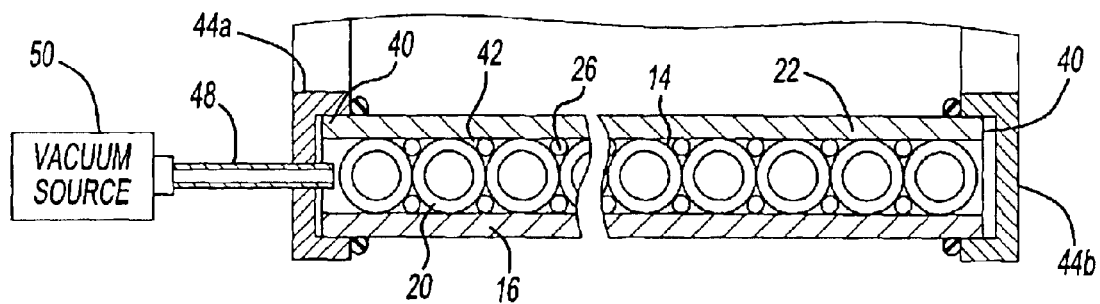
FIG. 4 is a sectional view similar to that of FIG. 2 but illustrating the fabrication of the article of FIG. 1 at a second intermediate stage.

The arrangement of the outer and inner closeout skins 16 and 22 adjacent the outer and inner surfaces 30 and 32, respectively, of the tube segments 20 forms an assembly 36. As shown in FIG. 4, the ends 40 of the assembly 36 are next closed in an evacuatable manner (i.e., in a manner that permits the air in the interior cavity 42 of the assembly 36 to be evacuated). In this regard, covers 44a and 44b are fitted to the opposite ends 40 of the assembly 36 and thereafter welded or otherwise sealingly coupled to the outer and inner closeout skins 16 and 22 to seal the interior cavity 42. In the particular embodiment illustrated, the cover 44a is substantially identical to the cover 44b, except that the cover 44a includes an evacuation tube 48. The evacuation tube 48 is coupled to a vacuum source 50 after the covers 44a and 44b are sealingly coupled to the opposite ends 40 of the assembly 36 to permit the air in the interior cavity 42 to be evacuated.

Thereafter, the evacuation tube 48 is crimped or plugged to inhibit fluid communication with the interior cavity 42 from outside the assembly 36. As those skilled in the art will appreciate, vacuum source 50 may be operated so as to maintain a vacuum within the interior cavity 42 and thereby eliminate the need for crimping or otherwise plugging the evacuation tube 48.

As those skilled in the art will understand from the discussion, below, it is critical to the methodology of the present invention that the inside wall 12 of the tube segments 20 be isolated from the environment that surrounds the assembly 36. Accordingly, techniques other than sealingly coupling covers 44a and 44b to the assembly 36 may alternatively be employed. For example, the entire assembly 36 may be placed in a vacuum bag (not shown) and thereafter deformed in the manner described below. As another example, the tubes 14 may be crimped, plugged or otherwise sealed so as to inhibit fluid communication of a fluid into the tube segments 20. In this latter example, the tubes 14 may be evacuated prior to their sealing, or they may be filled (fully or partially) with a fluid. The fluid may be incompressible or compressible, such as an inert gas like helium, argon or nitrogen. In yet another example, the tubes 14 may be coupled in fluid communication with a discrete pressure source (not shown), wherein the fluid from the discrete pressure source applies fluid pressure to the interior of the tube segments 20.

Figure 5:
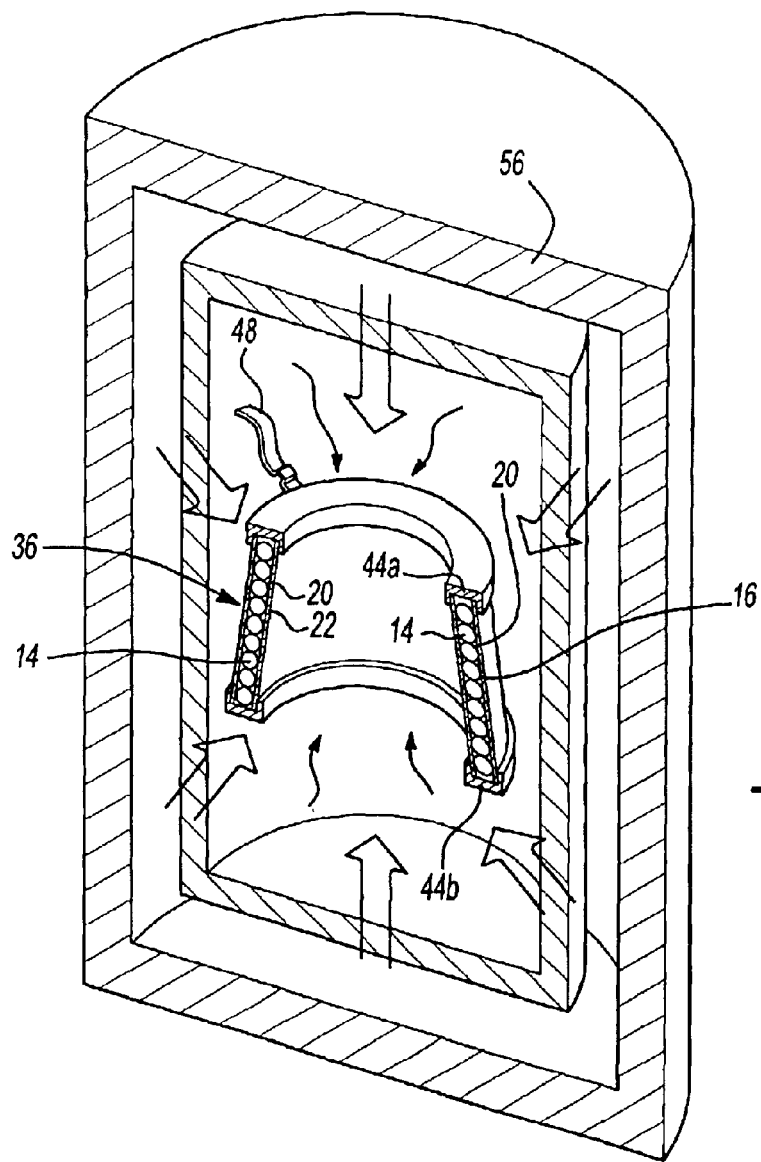
FIG. 5 is a sectional view of an autoclave illustrating the fabrication of the article of FIG. 1.

With the interior of the tube segments 20 thus isolated, the assembly 36 is next placed in an autoclave 56 as shown in FIG. 5, where it is exposed to a pressurized fluid. The autoclave 56 is of the type that is commonly employed in hot isostatic pressing (HIP) operations. The pressurized fluid is preferably an inert gas, such as helium, argon or nitrogen. Depending on various criteria including the strength of the tube segments 20, the overall processing time, and the manner by which the tube segments 20 are fixed together, the assembly 36 may also be exposed to elevated temperatures in the autoclave 56. Those skilled in the art will appreciate that depending on various factors including the mechanical properties of the material from which the tubes 14 are formed, heat, when used, may not be applied to the assembly in a continuous manner throughout the forming and coupling cycle, and that different amounts of heat may be employed during the forming and coupling cycle.

Pressure and heat (if utilized) are carefully controlled in the autoclave 56 to allow adequate deformation of the tube segments 20 as well as to meet the thermal cycle requirements (time and temperature) for the means by which the tube segments 20 are fastened together. Preferably, the tube segments 20 of the particular example provided are deformed (illustrated in FIG. 2) such that a first surface 60 of the tube segments 20 substantially conforms to a predetermined first wall configuration that is defined by the outer closeout skin 16, a second surface 62 of the tube segments 20 that is disposed opposite the first surface 60 substantially conforms to a predetermined second wall configuration that is defined by the inner closeout skin 22, and each of the tube segments 20 is substantially contiguous with at least one other tube segment 20 between the first and second surfaces 60 and 62. Preferably, each of the tube segments 20 is deformed such that it contacts at least one adjacent tube segment 20 over an area of about 5% to about 40% of the original circumference of the tube segment 20.

If a fastening portion of the cycle is needed and is not coincident with the forming portion of the cycle, the pressure and temperature of the fluid in the autoclave 56 my be adjusted as necessary after the forming portion of the cycle has been completed. In the example provided, the tube segments 20 and the outer closeout skin 16 of the exemplary article 10 are fixed together in a brazing operation and as such, the pressure and temperature of the fluid are controlled such that the forming and fastening portions of the cycle are coincident. While this approach is highly preferable due to reductions in cost and overall cycle time, those skilled in the art will appreciate that this is not the exclusive approach. For example, the pressure of the fluid may be reduced (e.g., to ambient air pressure) and the temperature of the fluid is raised above the melting point of the braze foil 26. Capillary action pulls the molten braze foil 26 between the tube segments 20 to ensure that the tube segments 20 are securely and completely joined to one another. Those skilled in the art will understand, however, that heat may not be needed for the coupling portion of the cycle, as when an epoxy resin is subsequently employed to fix the components of the assembly 36 to one another.

With the tube segments 20 fixedly coupled together, the covers 44a and 44b and the inner closeout skin 22 are removed. As noted above, the outer closeout skin 16 is included in the final configuration of the exemplary article 10. Those skilled in the art will understand, however, that the article 10 may alternatively be configured to include only the tube segments 20, the tube segments 20 with only the inner closeout skin 22, or the tube with both the outer and inner closeout skins 16 and 22.

Construction in this manner is highly advantageous over the prior art construction techniques in that relatively low toleranced components (i.e., tubes 14, outer and inner closeout skins 16 and 22) may be employed without adversely generating voids between the tube segments 20 that are common with other tube wall construction techniques.

The following example is illustrative in nature and is not intended to limit the scope of the disclosure in any manner.

The tubes 14, which are formed from A-286 alloy, vary in size from about 0.6 mm (0.024 inches) in diameter to about 1.65 mm (0.065 inches) and have a wall thickness of about 0.18 mm (0.007 inches). The tubes 14 are stacked in a longitudinal manner in the outer closeout skin 16, which is also formed from A-286 alloy and which has a thickness of about 0.76 mm (0.03 inches) to about 3.30 mm (0.13 inches). The braze foil 26 is PalNiro-7 (AMS-4786) and is commercially available. The inner closeout skin 22 is formed from A-286 alloy and has a thickness of about 0.76 mm (0.03 inches) to about 3.30 mm (0.13 inches). The assembly 36 is made according to the above disclosure and the interior cavity 42 between the outer and inner closeout skins 16 and 22 is evacuated.

The assembly 36 is place in the autoclave 56 and subjected to a pressure of 689.5 kPa (100 p.s.i.) and a temperature of 1038° C. (1900° F.) for a period of about 3 hours to deform the tube segments 20 and simultaneously melt the braze foil 26 to thereby braze the tube segments 20 to one another and the outer closeout skin 16.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for forming an article having a wall that is at least partially formed from a tube, the method comprising the steps of:

providing at least one tube;

stacking the at least one tube in a predetermined manner such that the at least one tube forms a plurality of tube seqments that are approximately abutted against one another; and employing a pressurized fluid to compress the plurality of tube seqments such that a first surface of the at least one tube substantially conforms to a predetermined first wall configuration, a second surface of the at least one tube that is disposed opposite the first surface substantially conforms to a predetermined second wall configuration and each of the tube seqments is substantially contiguous with at least one other tube segment;

wherein the at least one tube is evacuated prior to the step of exposing the at least one tube to a pressurized fluid.

2. The method of claim 1, further comprising the step of heating the at least one tube to a predetermined temperature.

3. The method of claim 2, wherein the step of heating the at least one tube and the step of exposing the at least one tube to the pressurized fluid are performed substantially simultaneously.

4. The method of claim 2, further comprising the step of brazing the tube segments together.

5. The method of claim 1, wherein the first and second surfaces are generally parallel to one another.

6. The method of claim 1, wherein the pressurized fluid is a gas that is selected from a group of gasses consisting of argon, nitrogen and helium.

7. The method of claim 1, wherein prior to the step of exposing the at least one tube to the pressurized fluid the method further comprises the steps of:

providing a first closeout skin structure, the first closeout skin structure having a first skin surface that defines the predetermined first wall configuration; and abutting the first skin surface to the first surface of the at least one tube.

8. The method of claim 7, wherein prior to the step of exposing the at least one tube to the pressurized fluid the method further comprises the steps of:

providing a second closeout skin structure, the second closeout skin structure having a second skin surface that defines the predetermined second wall configuration; and abutting the second skin surface to the second surface of the at least one tube.

9. The method of claim 8, further comprising the step of removing at least one of the first and second closeout skin structures from the at least one tube after the step of exposing the at least one tube to the pressurized fluid.

10. A method for forming an article having a wall that is at least partially formed from a tube, the method comprising the steps of:

providing at least one tube:

stacking the at least one tube in a predetermined manner such that the at least one tube forms a plurality of tube segments that are approximately abutted against one another; and employing a pressurized fluid to compress the plurality of tube segments such that a first surface of the at least one tube substantially conforms to a predetermined first wall configuration, a second surface of the at least one tube that is disposed opposite the first surface substantially conforms to a predetermined second wall configuration and each of the tube segments is substantially contiguous with at least one other tube segment;

wherein prior to the step of exposing the at least one tube to the pressurized fluid the method further comprises the step of at least partially filling the at least one tube with a fluid.

11. The method of claim 10, wherein the fluid in the at least one tube is a compressible fluid.

12. The method of claim 11, wherein the compressible fluid is an inert gas.

13. The method of claim 10, further comprising the step of heating the at least one tube to a predetermined temperature.

14. The method of claim 13, wherein the step of heating the at least one tube and the step of exposing the at least one tube to the pressurized fluid are performed substantially simultaneously.

15. The method of claim 13, further comprising the step of brazing the tube segments together.

16. The method of claim 10, wherein the first and second surfaces are generally parallel to one another.

17. The method of claim 10, wherein the pressurized fluid is a gas that is selected from a group of gasses consisting of argon, nitrogen and helium.

18. The method of claim 10, wherein prior to the step of exposing the at least one tube to the pressurized fluid the method further comprises the steps of:

providing a first closeout skin structure, the first closeout skin structure having a first skin surface that defines the predetermined first wall configuration; and abutting the first skin surface to the first surface of the at least one tube.

19. The method of claim 18, wherein prior to the step of exposing the at least one tube to the pressurized fluid the method further comprises the steps of:

providing a second closeout skin structure, the second closeout skin structure having a second skin surface that defines the predetermined second wall configuration; and abutting the second skin surface to the second surface of the at least one tube.

20. The method of claim 19, further comprising the step of removing at least one of the first and second closeout skin structures from the at least one tube after the step of exposing the at least one tube to the pressurized fluid.

21. A method for forming an article having a wall that is at least partially formed from a tube, the method comprising the steps of;

providing at least one tube;

arranging the at least one tube in a predetermined manner such that the at least one tube forms a plurality of tube segments that are abutted against one another in a stacked arrangement, each of the tube segments having an annular cross-section with an outer circumference, the annular cross-section being taken generally perpendicularly to a longitudinal axis of the tube segment;

employing a pressurized gas to compress the plurality of tube seqments such that a surface of the at least one tube substantially conforms to a predetermined wall configuration and each of the tube seqments contacts at least one adjacent tube seqment over an area that exceeds about 5% of the circumference of the tube segment; and heating the at least one tube to a predetermined temperature;

wherein the at least one tube is evacuated prior to the step of exposing the at least one tube to a pressurized fluid.

22. The method of claim 21, wherein the step of exposing the at least one tube to the pressurized gas and the step of heating the at least one tube are performed substantially simultaneously.

23. The method of claim 21, further comprising the step of brazing the tube segments together.

24. The method of claim 21, wherein the pressurized fluid is a gas that is selected from a group of gasses consisting of argon, nitrogen and helium.

25. The method of claim 21, wherein prior to the step of exposing the at least one tube to the pressurized gas the method further comprises the steps of:

providing a closeout skin structure, the closeout skin structure having a skin surface that defines the predetermined wall configuration; and abutting the skin surface to the surface of the at least one tube.

26. The method of claim 25, further comprising the step of removing the closeout skin structure from the at least one tube after the step of heating the at least one tube.

27. A method for forming an article having a wall that is at least partially formed from a tube, the method comprising the steps of:

providing at least one tube;

arranging the at least one tube in a predetermined manner such that the at least one tube forms a plurality of tube seqments that are abutted against one another in a stacked arrangement, each of the tube segments having an annular cross-section with an outer circumference, the annular cross-section being taken generally perpendicularly to a longitudinal axis of the tube seqment;

employing a pressurized gas to compress the plurality of tube segments such that a surface of the at least one tube substantially conforms to a predetermined wall configuration and each of the tube seqments contacts at least one adjacent tube seqment over an area that exceeds about 5% of the circumference of the tube segment; and heating the at least one tube to a predetermined temperature;

wherein prior to the step of heating the at least one tube the method further comprises the step of at least partially filling the at least one tube with a fluid.

28. The method of claim 27, wherein the fluid in the at least one tube is a compressible fluid.

29. The method of claim 28, wherein the compressible fluid is an inert gas.

30. The method of claim 27, further comprising the step of pressurizing the fluid.

31. The method of claim 27, wherein the step of exposing the least one tube to the pressurized gas and the step of heating the least one tube are performed substantially simultaneously.

32. The method of claim 27, further comprising the step of brazing the tube segments together.

33. The method of claim 27, wherein the pressurized fluid is a gas that is selected from a group of gasses consisting of argon, nitrogen and helium.

34. The method of claim 27, wherein prior to the step of exposing the at least one tube to the pressurized gas the method further comprises the steps of:

providing a closeout skin structure, the closeout skin structure having a skin surface that defines the predetermined wall configuration; and abutting the skin surface to the surface of the at least one tube.

35. The method of claim 34, further comprising the step of removing the closeout skin structure from the at least one tube after the step of heating the at least one tube.

* * * * *